United States Patent Office 2,748,074
Patented May 29, 1956

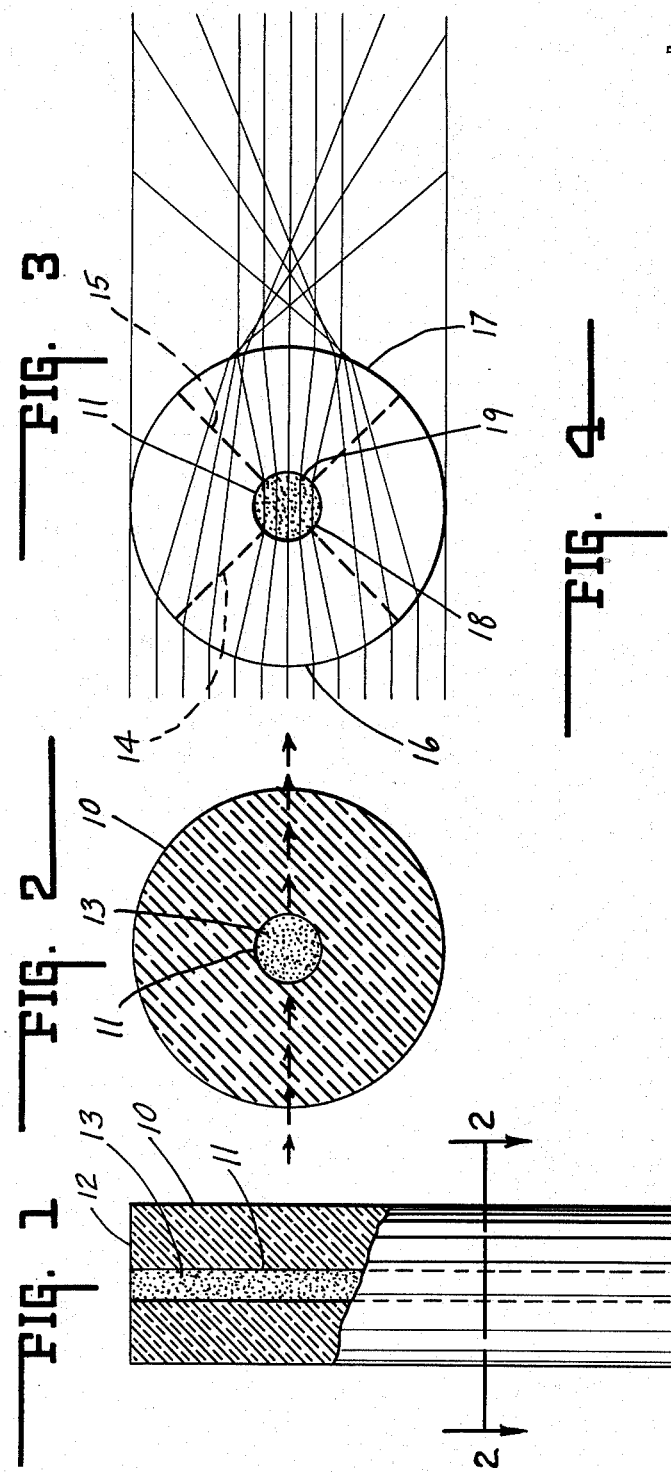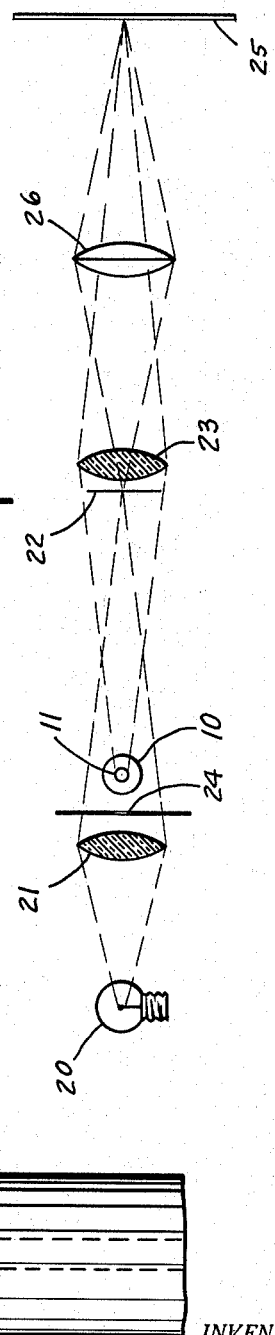

2,748,074
ELECTROPHORETIC MICROCELL
William W. Davis, Greenwood, and Thomas V. Parke, Indianapolis, Ind., assignors to Eli Lilly and Company, Indianapolis, Ind., a corporation of Indiana Application August 31, 1951, Serial No. 244,677
3 Claims. (Cl. 204—299)

This invention relates to electrophoresis apparatus and more particularly to a specimen or sample container or cell for use especially in small scale electrophoretic analytical methods and apparatus.

Electrophoretic cells heretofore available are generally of rectangular or square cross section and for the most part, formed in the shape of a U having plane, parallel, windows ground and polished to an optically flat surface. Such cells are quite expensive, costing over one hundred dollars each.

A typical example of the use of such cells in the field of medicine is in protein analysis of blood serum. The quantity of specimen or sample material necessary for analysis in the smallest of such cells as have been heretofore provided is on the order of 5 mg. In blood counts as presently carried out by modern medical practitioners, it is customary to make a simple, rapid, puncture, with a sharp point, at the end of the patient's finger and to express but a single drop of blood. Such practice has been found much more convenient and less uncomfortable to the patient than the older practice of inserting a hypodermic needle and withdrawing a larger quantity of blood. Bearing in mind that the amount of serum protein available from a single drop of blood is usually about 1 mg., it is apparent that a microcell capable of permitting analysis of extremely small quantities (1 mg. or less) of a sample or specimen would perform a valuable function in connection with present day clinical, chemical and medical requirements and more particularly in problems requiring electrophoretic analysis of exceedingly small quantities of sample.

Accordingly it is an object of the present invention to provide a simple, effective but inexpensive microcell which will permit of electrophoretic analysis of a sample or specimen of a quantity as small as 1 mg.

A further object of the invention is to provide a cylindrical microcell which, by the ratio of diameter between its sample receiving bore and exterior wall together with the sample-carrying medium such as dilute salt solutions, agar or other gel material contained within the bore, obviates completely the necessity for grinding and polishing the walls of the cell to an optically flat surface and thus materially reduces manufacturing costs.

A further object is to provide an electrophoretic cell in which the agar or other gel material which can be utilized to stabilize the various components of the sample during their electrical transport, is contained within the cell bore in readiness for use in the electrophoretic apparatus.

A still further object is to provide a microcell of the above character which permits of the facile and expeditious introduction and removal of the agar into and from the sample receiving bore of the cell.

A still further object is to provide a microcell whereby a substantially flat end can be formed readily on the agar or other gel contained in the cell for the purpose of obtaining an extremely sharp, distinct and flat initial sample boundary at the commencement of the electrical transport of various components of the sample.

With the foregoing and other objects in view the invention will be more fully described hereinafter, and will be more particularly pointed out in the claims appended hereto.

In the drawings:
Fig. 1 is an enlarged side elevation of the cylindrical microcell,
Fig. 2 is an enlarged cross section taken along the line 2—2 of Fig. 1,
Fig. 3 is a diagrammatic view similar to Fig. 2 but illustrating how the correlated diameters of the sample-receiving bore and the exterior wall of the cell in conjunction with an agar column contained within the bore, act to neutralize the negative lens effect normally present in the cell when empty, and
Fig. 4 is a diagrammatic illustration of an optical system of the type with which the cell is employed for observing refractive index gradients developed by electrophoresis.

The microcell consists of a cylindrical tube 10 of glass such as "Pyrex" or the like, having a refractive index of about 1.474. The cell as herein illustrated is shown proportionately to be of a length on the order of 75 mm.; it will be understood, however, that the length of the cell is governed solely by the requirements of the particular user and the capacity of the particular electrophoresis apparatus with which the cell is to be used. A bore 11 extends longitudinally and centrally through the tube from one end to the other, the bore being of a diameter on the order of 1.75 mm. The external diameter of the tube is on the order of 4.3 times that of the diameter of the bore. We have found a tube having an external diameter of 7.5 mm. to work very satisfactorily. At least one end 12 of the tube is ground to a flat surface for a purpose hereinafter appearing.

While as before stated, the length of the tube is determined substantially by the discretion of the user and the type of electrophoresis apparatus with which the tube is to be used, we have found that to attain the objects of the invention it is extremely important that the diameter of tube 10 with respect to the diameter of bore 11 be held substantially to a ratio on the order of 4.3 to 1. This is extremely important in attaining inexpensively, the optical qualities present in the cells generally commercially available of that character which are formed usually with a rectangular or square cross section.

The bore 11 is filled completely with a suitable gel material 13 such as agar or the like and that end of the gel material 13 which lies adjacent to the flat end of the tube 10 is molded, scraped or otherwise suitably formed flat and flush with the flat end of the tube as shown in Fig. 1. With this column of gel material 13 inserted in bore 11 a cell is provided cheaply and inexpensively at a cost of only a few cents and such cell has many of the optical qualities of the hitherto available electrophoretic cells of rectangular or square cross section and having plane, parallel windows ground and polished to an optically flat surface, which latter cells cost upwards of $150.00 each. This marked savings in the cost of a cell is obtained by adhering substantially to the 4.3 to 1 ratio between the external diameter of the cylindrical tube 10 and the diameter of bore 11 coupled with the filling of such bore with a sample-carrying medium such as dilute salt solution or an aqueous gel material such as agar or the like. It should be noted, in passing, that such gel material is frequently used in electrophoresis operations for the purpose of stabilizing the various components of the specimen or sample during the electrical transport of such components incident to the passage of electrical current through the gel material.

Referring to Fig. 2, therein is indicated by a series of arrows the path of a light beam passing through the cell. The opposed sectors 14 and 15 delineated in dotted lines in the diagrammatic showing of the cell in Fig. 3 and lying on opposite sides of the gel-filled bore 11, produce a convergent refracting effect by virtue of their external air-glass surfaces 16 and 17, respectively. Whereas the internal gel-glass surfaces 18 and 19, respectively, produce a marked divergent refracting effect of an intensity substantially such as to balance exactly the convergent refracting effect of the air-glass surfaces 16—17. In other words, if an object such as a line of fine type were to be viewed through the cell 10 constructed according to the specifications hereinabove set forth, with the bore 11 devoid of gel or other liquid or like substance it would be observed that such a line of type would be compressed heightwise due to the over-all negative lens effect of the air-glass surfaces 16—17 and 18—19 which latter in the present example are being considered as air-glass rather than gel-glass surfaces. However, if the bore 11 is filled with a transparent liquid or gel and the same line of type is observed through the bore such type will appear perfectly normal and undistorted. This is so, because, as before mentioned, the gel-glass surfaces 18—19 produce a strong divergent refractive effect which negates substantially completely the convergent refractive effect produced by the air-glass surfaces 16—17.

The general type of optical system with which a cell of this character is employed for observing the refractive index gradients developed by electrophoresis, is illustrated diagrammatically in Fig. 4. Such apparatus includes a light source 20 which is focused by means of a schlieren lens 21 upon a slightly inclined cross wire 22 lying in front of and immediately adjacent a "camera" lens 23. The light beam cast from source 20 passes through an optical slit 24 thence through the cell 10 so that an image of the sample-containing column 13 is focused by means of "camera" lens 23 upon a ground glass screen 25. A cylinder lens 26 concurrently focuses an image of wire 22 upon screen 25. Suitable carriage mechanism (not shown) is provided for moving the tubular cell 10, lengthwise to scan different portions of the gel column 13 across the axis of the optical system so that appropriate readings may be taken from suitable calibrations (not shown) provided on screen 25, on a line passing through the axis of the optical system.

It will be understood of course, that before placing cell 10 in the apparatus for the taking of this optical reading, a specimen or sample such as, for example, a drop of blood will have been introduced adjacent to the gel column and submitted to electrophoresis which, by electrical transport causes the components of the sample to migrate at various rates of speed into the gel column and thus effects boundary separations in the usual manner. By the provision of a cell having the characteristics just described it has been made possible to analyze extremely small quantities of samples, i. e., quantities on the order of 1 mg. or less. As was heretofore pointed out this is an important contribution to the art and is particularly useful under the present day practices of analyzing blood samples wherein a single drop of blood is taken as the sample, or of analyzing other experimental samples of protein solutions.

A flat surface 12 enables the ready and facile formation as by molding or scraping of the upper end of column 13 into a matching flat surface and this contributes materially to the usefulness of the cell in that an extremely sharp, distinct, flat initial sample boundary is obtainable at the very outset of the period of electrical transport in the electrophoresis operation.

It will be understood of course, that the cell may be increased in size and utilized for the analysis of larger samples, the only requirement being that the 4.3 to 1 ratio between the external diameter of the cell and the diameter of its bore 11 be substantially adhered to.

If desired, the wall of bore 11 can be coated with a thin, adherent film of a silicone or other hydrophobic substance to assist in assuring a better bond between the gel column and the wall of the bore and to reduce the zeta potential of the glass surface and thus reduce possibility of potential electroösmotic effect.

It will thus be seen that we have provided a microcell which serves an extremely valuable and useful function in present day chemical, clinical and medical requirements and, moreover a cell which costs only in the neighborhood of 15 to 25 cents as compared with cells heretofore available generally only at a cost of over a hundred dollars.

What we claim is:

1. A microcell for receiving samples in electrophoretic apparatus, comprising a cylindrical glass tube having a refractive index of about 1.474 and of an external diameter of substantially 7.5 mm., and having a cylindrical bore of a diameter of substantially 1.75 mm. extending axially therethrough, said bore being filled with an aqueous sample-carrying medium having substantially the refractive index of a dilute salt solution for receiving a sample introduced therein, and said filled bore serving additionally to produce a divergent refracting effect sufficient to neutralize the convergent refracting effect of the air-glass surfaces of the oppositely disposed side wall sections of said tube lying adjacent said bore.

2. A microcell for containing or receiving samples to be electrophoretically analyzed comprising a straight, clear, cylindrical, glass tube having a refractive index of approximately 1.474 and of a diameter substantially 7.5 mm. and having an axial, co-extending cylindrical bore of a diameter substantially 1.75 mm., said tube being formed substantially flat at at least one end thereof, and said bore being filled with a column of gel material having a refractive index substantially that of a dilute aqueous salt solution and forming a gel-glass surface, said gel-column serving to stabilize the electrical transport of the components of the sample to be tested and said gel-glass surface producing a divergent refracting effect sufficient to neutralize the convergent refracting effect of the air-glass surfaces and thus provide relatively optically aberration-free windows.

3. A microcell for receiving samples to be electrophoretically analyzed comprising a cylindrical glass tube having a refractive index of about 1.474 and having at least one end thereof formed flat, said tube having an external diameter of about 7.5 mm. and an axial, longitudinally extending cylindrical bore of a diameter of about 1.75 mm., said bore being completely filled with a column of gel material having substantially the refractive index of a dilute aqueous salt solution with at least one end of said column flat and flush with the flat end of said tube whereby the electrical migration of various components of a sample introduced into said cell for electro-phoretic analysis are stabilized during their electrical transport in said column and the positive or convergent refracting effect of the air-glass surfaces of the diametrically opposed sections of said tube is counteracted and neutralized by the negative or divergent refracting effect produced by the gel-glass surfaces of said column and bore.

References Cited in the file of this patent

UNITED STATES PATENTS

| | | |
|---|---|---|
| 2,495,297 | Stern | Jan. 24, 1950 |
| 2,566,308 | Brewer | Sept. 4, 1951 |
| 2,657,146 | Kreidl | Oct. 27, 1953 |

OTHER REFERENCES

"Industrial & Engineering Chemistry," Analytical Edition, vol. 18 (1946), pages 219 thru 229.

"Transactions of the Faraday Society," vol. 33 (1937), pp. 524–531.

"Journal of American Chemical Society," vol. 48 (1926), pp. 2272 thru 2278.

Thompson, M. R.: "Principles of Microelectrophoresis Cells," pp. 405–422 as Preprint 81—27 of The Electrochemical Society, New York city, 1942.